US009747278B2

(12) United States Patent
Bier et al.

(10) Patent No.: US 9,747,278 B2
(45) Date of Patent: Aug. 29, 2017

(54) SYSTEM AND METHOD FOR MAPPING TEXT PHRASES TO GEOGRAPHICAL LOCATIONS

(75) Inventors: Eric A. Bier, Palo Alto, CA (US); Anna Wu, State College, PA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 118 days.

(21) Appl. No.: 13/403,893

(22) Filed: Feb. 23, 2012

(65) Prior Publication Data
US 2013/0226928 A1 Aug. 29, 2013

(51) Int. Cl.
*G06F 17/30* (2006.01)
*G06F 17/27* (2006.01)

(52) U.S. Cl.
CPC ...... *G06F 17/278* (2013.01); *G06F 17/30241* (2013.01)

(58) Field of Classification Search
CPC ................ G06F 17/30241; G06F 17/30182
See application file for complete search history.

(56) References Cited

U.S. PATENT DOCUMENTS

| | | | | |
|---|---|---|---|---|
| 6,026,388 A * | 2/2000 | Liddy et al. | | |
| 7,117,199 B2 * | 10/2006 | Frank | ............... | G06F 17/30241 |
| 7,318,022 B2 * | 1/2008 | Li | ................... | 704/10 |
| 8,015,183 B2 * | 9/2011 | Frank | ............... | G06F 17/30241 |
| | | | | 702/179 |
| 8,301,364 B2 * | 10/2012 | Rolf | .................... | G01C 21/3679 |
| | | | | 345/601 |
| 8,332,396 B1 * | 12/2012 | Srinivasaiah | .......... | G06Q 30/02 |
| | | | | 707/723 |
| 9,278,695 B2 * | 3/2016 | Shin | ..................... | B60W 40/06 |
| 2006/0271535 A1 * | 11/2006 | Hammond et al. | ............ | 707/5 |
| 2008/0010262 A1 * | 1/2008 | Frank | ............... | G06F 17/30241 |
| 2008/0010273 A1 * | 1/2008 | Frank | ............... | G06F 17/30241 |
| 2008/0010605 A1 * | 1/2008 | Frank | ............... | G06F 17/30241 |
| | | | | 715/765 |
| 2008/0065621 A1 * | 3/2008 | Ellis | ................................ | 707/5 |
| 2009/0119255 A1 * | 5/2009 | Frank | ................. | G06F 17/3087 |
| 2011/0184636 A1 * | 7/2011 | Rolf | .................... | G01C 21/3679 |
| | | | | 701/532 |
| 2011/0264664 A1 * | 10/2011 | Xiao et al. | .................... | 707/741 |
| 2011/0302179 A1 * | 12/2011 | Agrawal | ...................... | 707/754 |
| 2012/0117007 A1 * | 5/2012 | Agrawal et al. | ............... | 706/12 |
| 2013/0013620 A1 * | 1/2013 | Rolf | .................... | G01C 21/3679 |
| | | | | 707/748 |

* cited by examiner

*Primary Examiner* — Ashish K Thomas
*Assistant Examiner* — Mellissa M Ohba
(74) *Attorney, Agent, or Firm* — Patrick J. S. Inouye; Krista A. Wittman

(57) ABSTRACT

A system and method for mapping text phrases to geographical locations is provided. Entities, each comprising one of a location, person, and place, are identified in one or more documents. Possible candidate locations associated with each entity are determined. An initial score is assigned to each location. The initial scores are adjusted and the candidate location with the highest adjusted score is selected for each entity. The selected candidate location is applied to all occurrences of the entity in the documents.

20 Claims, 11 Drawing Sheets

| Entity Type | Resource | Details |
|---|---|---|
| Location | GeoNames | 8 million geographical names available. 234k international cities with population > 5k, 3k US county, 3k US states/provinces, and 241 countries. |
| Location | DBpedia | 30k US cities with pop < 5k |
| Person's name | US Census | Popular contemporary female (top 1k)/male(top 300) firstnames, last names(top 1k) withfrequency |
| Dictionary words | British National Corpus | 5k most common spoken and written English words |
| Date/Time | | Holidays, weekdays, months. |

FIG. 5

71 — Text: "Henry Ford was one of eight children of William and Mary Ford. He was born on the family farm near Dearborn, Michigan, then a town eight miles west of Detroit, on July 30, 1863."

72 — Results:

73 — 0 | 5 | Henry | <Location#City>
6 | 4 | Ford | <Location#City>
53 | 4 | Mary | <Location#City>
58 | 4 | Ford | <Location#City>
100 | 18 | Dearborn, Michigan | <Location#CityState>
152 | 7 | Detroit | <Location#City>
0 | 10 | Henry Ford | <person>
41 | 7 | William | <person>
53 | 9 | Mary Ford | <person>
164 | 13 | July 30, 1863 | <date>

*FIG. 6*

| # | Heuristic | Description | Example |
|---|---|---|---|
| H1 | Formatted group | Comma, space separation of two locations that have embedded relationship | Palo Alto, CA |
| H2 | Hint words | Words that provide a reliable indication before and after place names | City of … |
| H3 | Uniform meaning | The Toponym shares the same name with the previous identified toponym | …in *Florence*, Italy… *Florence*…. |
| H4 | Variation of people's name, holiday | If the word is part of previously identified people's names (and its variation) or holidays, it is not a location. | *Mary* Smith was born in … In the photograph, *Mary* … |
| H5 | Exclusions | Exclude those entities that are named after places, but are not a city/state/country… | *Pennsylvania* State University |

FIG. 9

SYSTEM AND METHOD FOR MAPPING TEXT PHRASES TO GEOGRAPHICAL LOCATIONS

FIELD

This application relates in general to geocoding, and in particular, to a system and method for mapping text phrases to geographical locations.

BACKGROUND

As the amount of available textual information grows, efficient and accurate methods to filter and organize the information are necessary. Generally, geographic data is of interest to individuals who care about things related to the places they live, work, or travel. Estimates indicate that 70% of documents include references to geographic locations.

However, the geographic data provided in these documents is often ambiguous due to the flexibility of natural language, and the data cannot be accurately geocoded. There are two common types of ambiguity, including geographic/non-geographic ambiguity and geographic/geographic ambiguity. The geographic/non-geographic ambiguity includes a word that can represent a location or a regular dictionary word or name. For example, Washington can represent the state or a person's name. The geographic/geographic ambiguity includes a word for a location, such as "San Francisco," but fails to indicate which particular location for "San Franciso" is referenced, including San Francisco, Calif. or San Francisco, Nayarit, Mexico. Studies show that a single location name can have 4.4 different meanings on average, while 11.5% of the nouns in WordNet can have geographic interpretations. Also, a reader's interpretation of a written word, such as a location, can further exacerbate the ambiguity problem. For instance, a reader from Texas that reads a newspaper article about Paris may conclude that the term "Paris" refers to Paris, Tex., rather than Paris, France.

Therefore, a system and method for distinguishing locations and resolving any ambiguities is needed to efficiently and accurately map text phrases to geographical locations and provide coordinates for the locations.

SUMMARY

One embodiment provides a system and method for mapping text phrases to geographical locations. Entities, each comprising one of a location, person, and date, including holidays or time periods, are identified in one or more documents. Possible candidate locations and person names associated with each entity are determined. An initial score is assigned to each candidate. The initial scores are adjusted and the candidate with the highest adjusted score is selected for each entity. The selected candidate is applied to all occurrences of the entity in the documents.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 is a block diagram showing, by way of example, a table of data for generating entity lists.

FIG. 6 is block diagram showing, by way of example, a text segment from a document and entity results.

FIG. 9 is a block diagram showing, by way of example, heuristic rules for applying to a document to identify types of entities.

DETAILED DESCRIPTION

Geographical information can be used to map locations, plot landmarks and crimes, assocate coordinates with photographs, determine coordinates for use during geocaching activities, and manage information of interest in documents. However, ambiguities between textual information to be geocoded, such as locations can result in inaccurate assignments of coordinates. Any ambiguities in text phrases must be determined to accurately geocode locations represented by the text phrases for mapping purposes. The ambiguities can be identified and resolved through a multi-step analysis, which considers ambiguities between geographic locations, as well as ambiguities between locations and other entities, such as person names and dictionary words.

Figure 1:
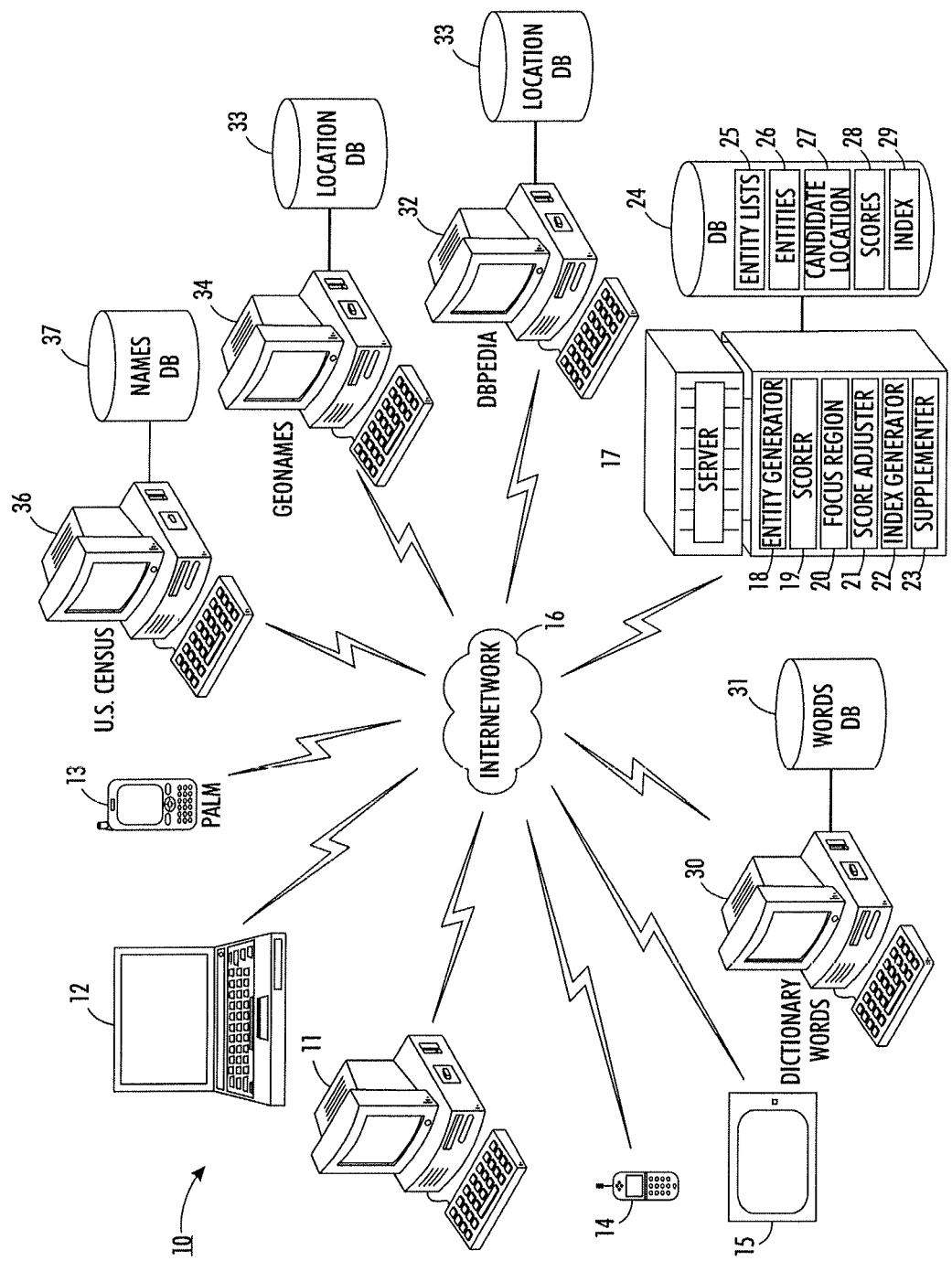
FIG. 1 is a block diagram showing a system for mapping text phrases to geographical locations, in accordance with one embodiment.

Geocoding requires a support environment within which ambiguities are identified, analyzed, and resolved. FIG. 1 is a block diagram showing a system for mapping text phrases to geographical locations, in accordance with one embodiment. An end-user computer 11 is connected to a server 17 via an internetwork 16, such as the Internet. Other end-user devices, such as a notebook computer 12, a handheld device, such as a Personal Digital Assistant (PDA) 13, a Web-enabled cellular telephone 14, or a Web-enabled tablet can also be connected to the internetwork 16. At a minimum, each device should include accessibility to an internetwork and have an ability to execute an application. The server 17 can include, for instance, an entity generator 18, a scorer 19, a focus region module 20, a score adjuster 21, an index generator 22, and a supplementer 23. Additionally, the server 17 can include, for instance, a Web server (not shown) that is coupled to a database (not shown), which stores Web pages 32, 34, 36 for perusal by end users.

The entity generator 18 identifies entities within a document and labels the entities by type, where a single entity may be assigned more than one type. From the identified entities, ambiguous entities are determined and the scorer 19 assigns initial scores to each representative type for the ambiguous entity. The entities can be ambiguous based on a single entity potentially representative of two or more locations or a single entity potentially representative of a location and a person name or time. Identifying entities is described in further detail below with reference to FIG. 3. Focus regions 20 are identified for a document based on the entities that represent a location. Determination of the focus regions is further described below with reference to FIG. 7. The score adjuster 21 adjusts the initial scores for each of the representative entity types via one or more subroutines. The subroutines are further described below with reference to FIG. 8. The final scores are used to resolve any ambiguities between two or more representative entity types and an identification of the type with the highest score is determined to represent that entity within the document. The index generator 22 generates an index for those entity types with the highest final score. Determining and assigning the final score is further described below with reference to FIGS. 8-11. Finally, the supplementer 23 supplements occurrences of the selected entity types with the determined identification. The location entities can be geocoded to determine associated latitude and longitude coordinates.

The server 17 is interconnected to a database, which includes entity lists 25, entities 26, candidate locations 27, scores 28, and indices 29. The computer 11 accesses remote databases via requested Web pages 32, 34, 36 to generate the entity lists. The gazetteer can be utilized by the entity generator 18 to determine the entities. The candidate locations can be determined for each ambiguous location entity and used to determine the focus regions for the document.

The computer 11 accesses Web pages (not shown) for displaying the entities, candidate locations, focus regions, scores, and index. Further, each of the entities, candidate locations, and focus regions can be provided on a map of a particular geographic region.

The user devices 11-15 and server 17 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
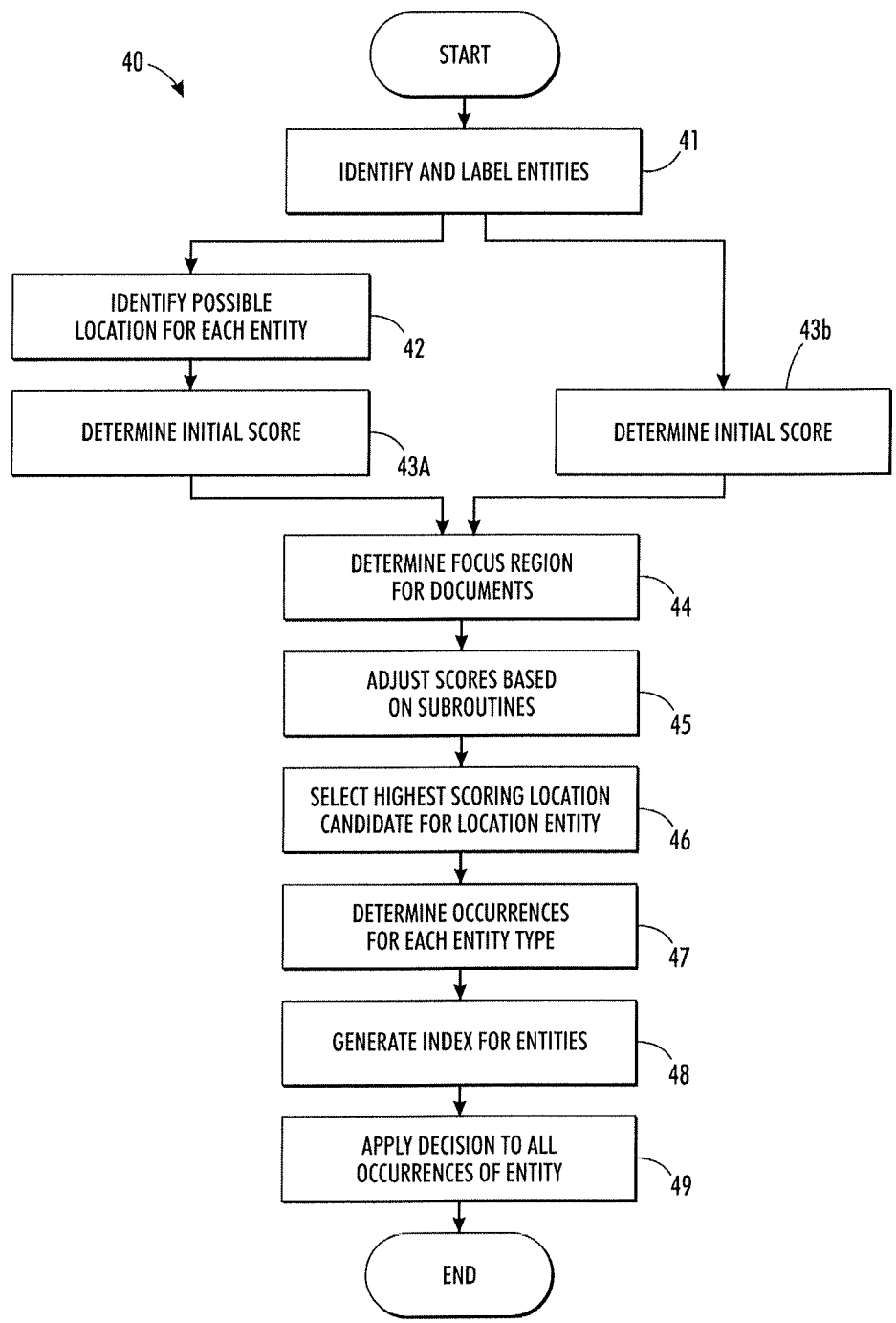
FIG. 2 is a flow diagram showing a method for mapping text phrases to geographical locations, in accordance with one embodiment.

To assign the correct geographical coordinates to a location referred by text, any ambiguities between locations or between locations and names of people or places must first be resolved. FIG. 2 is a flow diagram showing a method 40 for mapping text phrases to geographical locations, in accordance with one embodiment. Entities, such as locations, people, dictionary words, and dates, are identified (block 41) within one or more documents. Some entities may be ambiguous and can potentially represent more than one entity type, for example, a location and a person, or a person and a dictionary word. Therefore, each entity is assigned one or more labels with a representative entity type, such as identifying that entity as being representative of a location, person, dictionary word, or date. For example, the entity "Paris" can be assigned labels for a person's name and for a location. Entity identification is further described below with reference to FIG. 3. Each entity is associated with its location in the document for each occurrence and the assigned label for entity type. The associated document locations and assigned labels can be determined via a Finite State Transducer for each entity. Those entities with single labels for person, dictionary word, or date are excluded, while, the entities with more than one label, such as location and person name are further examined. Additionally, those entities with an ambiguous location label are also examined in further detail. For example, the entity "Paris" can refer to a location in Texas or a location in France.

For the entities associated with labels for person name, dictionary word, or date, an initial score is assigned (43*b*). The initial scores for person name can be based on a popularity of the name, while scores for the dictionary word can be based on a commonality of the word. Determination of the popularity of a name can be made using existing databases of names and popularity rankings. A predetermined score can be associated with each ranked name and subsequently the score associated with the ranked name that matches the entity is assigned. Also, for dictionary words, an existing database of words with commonality values can be accessed to assign predetermined scores to the dictionary word entities that match the words in the database.

Meanwhile, entities with location labels are analyzed and scored prior to, concurrently with, or after initial scoring of the entities with name labels. First, all possible locations are determined (block 42) as candidate locations for those entities associated with location labels. Returning to the example above, the candidate locations for the location entity "Paris" can include Paris, Tex. and Paris, France. Next, an initial score can be assigned (block 43*a*) to each of the candidate locations using two prominence measurements, including administrative level and relative population measurements. The initial score represents an individual's interpretation of the location candidate without providing any context for the interpretation. In one embodiment, all occurrences of an entity are grouped together and scored as a single entity, rather than scoring each separate occurrence of the entity. For instance, the entity "Paris" can be located in a document in line 4, position 3; line 9, position 5, and line 13, position 7, and all three occurrences are grouped and analyzed together as a possible location for Paris, Tex. or Paris, France.

The administrative level measurement assigns a score to each candidate location based on a particular administrative level to which the candidate location belongs. The administrative levels can include regions, country, state, county, capital, and city, as well as equivalents that are represented by different names in different geographical areas. Candidate locations that represent a region are assigned a highest score, while candidate locations that represent smaller geographical areas, such as a city, are assigned a lower score. The scores can be predetermined for each of the separate administrative levels and should reflect that individuals generally recognize a location as belonging to a higher administrative level than a lower administrative level. For instance, individuals are more likely to associate "China" with the country of that name, rather than with the city in Maine, USA, and associate "Paris" with the country France, rather than with the city in Texas, USA.

The relative population measurement is based on an assumption that cities with higher populations are better known. A candidate city location is compared to an average size of a city within the same country and classified based on the comparison as a metropolitan, large, regular, or small city. Comparative size is used instead of pure population to avoid the false boosting of insignificant cities in countries with higher population density, for example, to prevent a small city in China from being assigned a higher score than an important city in Canada. The classification can be based on a predetermined ratio for the comparison. In one embodiment, a candidate city location with a population that falls between 0 and 0.1 times of the average city population in the common country is classified as a small city. When the population falls between 0.1 and 50, the candidate city location is classified as a regular city, and when the population falls between 50 and 1000, the candidate city location is classified as a large city. Also, classification of a metropolitan city is assigned when the candidate city location has a population that is larger than 1000 times the average city population in that country. Other ratios and comparisons are possible. The higher the population of a candidate city location in comparison with an average city in that country, the higher the score assigned to the candidate city. For example, a score of 500 can be assigned to a metropolitan city, while a regular city is assigned a score of 80 and a small city is assigned a score of 5. In one embodiment, the scores from the relative population measurement are only provided for candidate city locations. However, scores for relative population can also be determined and assigned to other candidate location regions.

The initial score for candidate city locations is determined by combining the scores assigned from the administrative level and relative population measurements. Meanwhile, the initial score for other location regions, such as state and country, is based only on the administrative level population measurement. Subsequently, the candidate locations for each entity are sorted from high to low. However, other sorting methods are possible. Returning to the above Paris example, Paris, France may receive a higher initial score than Paris, Tex. based on the relative population measurement, which assigns a higher score to cities with a higher than average population and also based on the administrative level population, which assigns higher scores to the capital of France, rather than to a regular city in Texas.

After determining the initial scores for the entity types and candidate locations, focus regions associated with a document in which the entity is referenced are determined (block 44). The focus regions can include focus countries and focus states, as well as other focus regions, which can be used to increase interpretation of other locations in the document. If an entity represents a unique, locationally unambiguous location, such that there are no other locations with the same name, the entity can be used to set the focus state and country with higher confidence, which is provided using a higher weight. For instance, "Humptulips" is a unique name for a city in Washington State. Thus, the focus state is Washington, while the focus country is the United States.

However, for entities that can represent more than one location, focus regions can be determined by assigning a score to possible regions identified in a document. In one embodiment, the regions of interest can include country and state. Other regions are possible. For each region, a number of term occurrences for an ambiguous location entity belonging to that region is determined and multiplied by the initial score for one or more of the candidate locations within the same region. Further, the entity term occurrences and initial score are multiplied by an ambiguity weight for the entity. The ambiguity weight assigns higher weights, such as a predetermined value, to the unique, unambiguous entities. For instance, in one embodiment, if the entity is ambiguous, the ambiguity weight is one, while the weight for the unique, unambiguous entity is set to 1000. Other ambiguity weights are possible for the ambiguous and unambiguous entities. In a further embodiment, only candidate locations that represent very small ambiguously named cities are associated with an ambiguity weight of zero. For example, a very small city may be those cities with 100 people or less and would be unlikely to be referenced in the document. Other size thresholds are possible.

The effect of the ambiguity weight increases the score for a particular region with unambiguous entities, while lowering the score for a different region with ambiguous entities. Additionally, other locations mentioned by the document that are located within the same region as the entity can be considered. Specifically, the product of the term occurrence, initial score, and ambiguity weight for the candidate location is added to scores determined for the other locations in the same area, which are mentioned in the document.

Subsequently, the focus regions can be selected based on the assigned focus region score. In particular, focus states can be determined based on a score threshold. Meanwhile, focus countries can be determined by selecting one or more countries with the highest scores. The highest scores can be based on a predetermined number of countries with the highest score, based on a score threshold, or based on a combination of the predetermined number of countries and the score threshold. Based on the candidate location, the focus state can be used to determine the focus country or vice versa. However, in one embodiment, the focus state is determined first and the focus country is subsequently determined.

Returning to the above Paris example, focus region scores are determined for the country, France and the state, Texas. Based on the assigned scores, the focus state may be determined to be Texas if there are many co-occurrences of the entity "Paris" with other locations in Texas that are mentioned in the document. Accordingly, the focus country is determined to be the U.S.A. in which the focus state, Texas, is located. Calculating the focus region score for each country and state is further described below with reference to FIG. 7.

Next, the initial scores assigned to the different entity types and candidate location can be adjusted (block 45) based on one or more subroutines, which can include heuristics, context, vicinity, and focus information subroutines. Each subroutine is separately run and after, the entities and candidate locations are sorted. During the heuristics subroutine, one or more heuristic rules are applied to the text of the document that includes the ambiguous entity to utilize the context of the entity to adjust the initial score for each entity type or candidate location. The context subroutine utilizes natural language clues and mentions of other locations in the document to adjust the score for each candidate location. During the vicinity subroutine, the vicinity of a candidate location with respect to previously mentioned locations in the document is used to add context to the candidate location since a location will often be in the same geographic vicinity as other locations previously mentioned. The closer in location a candidate location is in relation to other locations in the document, the higher the score assigned to the candidate location. The focus information subroutine utilizes the lists of focus countries and focus states to assist in resolving ambiguous locations for an entity. Specifically, each candidate location for a location entity is compared with the selected focus country and state. If the candidate location is included within one or more of the selected focus regions, the score for that candidate location is increased by a predetermined amount.

The order for applying the subroutines can be predetermined or randomly selected. After each subroutine is applied, the entity types and candidate locations can be sorted by adjusted score prior to applying the next subroutine and ranked. Applying the subroutines and adjusting scores for the entities are described further below with reference to FIG. 8.

When the last subroutine has been applied, and the ambiguous entity types and candidate locations are ranked by high to low, the top candidate location is selected (block 46) for a location entity. Returning to the above example regarding the entity Paris, the initial scores for Paris the name, Paris Tex., and Paris France are adjusted using the above-described subroutines to determine a final score from which any ambiguities between location and name or candidate locations are resolved. Based on the final scores, Paris, Tex. is selected over Paris, France. Next, for an entity with ambiguous labels, the scores of the representative entity types, including the candidate locations, are compared and the representative entity type with the highest score is selected. For example, the candidate location scores for Paris, Tex. and Paris, France are compared with the person name entity, Paris to identify the term "Paris" having the highest score. In a further embodiment, only the scores for Paris, Tex. and Paris, a girl's name are compared since Paris, Tex. was previously determined to have a higher score than Paris, France. Once a particular entity type is selected as having the highest score, the entity type is applied to all occurrences of the entity in the document (block 47). In a further example, occurrences of each entity can be identified and the representative entity type can be applied to the occurrences. For instance, the entity Paris occurs ten times in a document and seven of the occurrences refer to Paris, the city in Texas, while three of the occurrences refer to Paris, the name of a girl.

An index is generated (block 48) for each ambiguous entity to map occurrences of that entity in the document. The index can be generated using a fast regular expression search, such as the FST (finite state transducer) system, developed at the Palo Alto Research Center, Inc.; however, other methods of generating the index are possible. The index can then be used to apply the determined identification (block 49) of the entity as a name or a selected candidate location, to the occurrences of that entity within the text. Returning to the above example, an index is created for Paris, a city in Texas, and Paris, a girl's name. The entity occurrences are then supplemented with the identified use of the entity.

The occurrences can be supplemented with the selected candidate based on a document level, as described above, or based on a sentence, paragraph, or other segment level for a document. Additionally, geographical coordinates for the identified location can also be determined for use in mapping the location, identifying other documents that mention the location, and identifying other documents that mention locations nearby the identified location.

Figure 3:
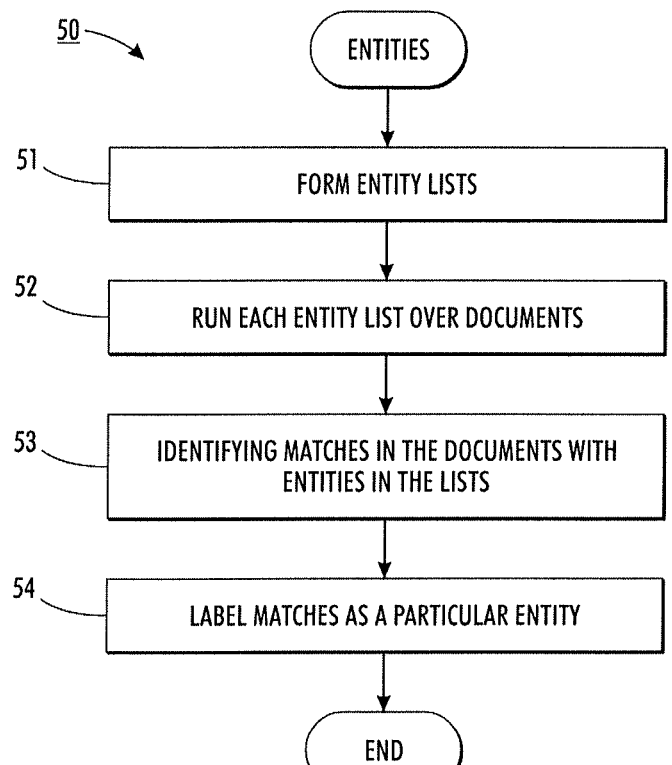
FIG. 3 is a flow diagram showing, by way of example, a process for identifying entities for use in the method of FIG. 2.
Figure 4:
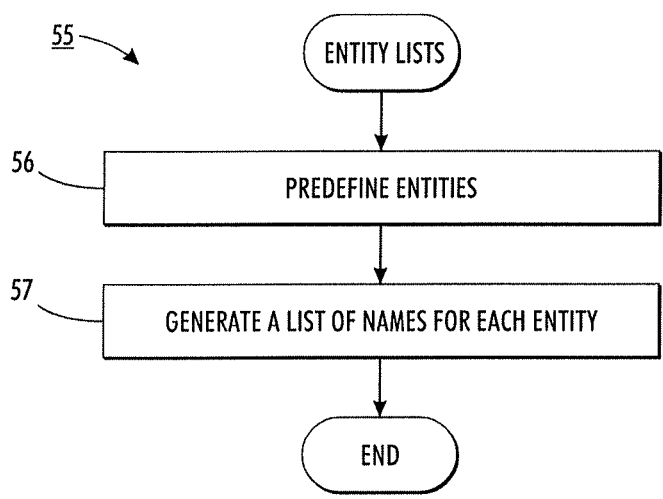
FIG. 4 is a flow diagram showing, by way of example, a process for generating entity lists for use in the process of FIG. 3.

Prior to assigning geographical coordinates to a particular location entity, the entity must first be determined and any ambiguities between entity type and location resolved. FIG. 3 is a flow diagram showing, by way of example, a process for identifying entities for use in the method of FIG. 2. Entity lists having names for different entity types are generated (block 51). The entity lists can be used to identify and label entities provided in a document. FIG. 4 is a flow diagram showing, by way of example, a process 60 for generating entity lists for use in the process of FIG. 3. A set of entities for inclusion in the entity lists is predefined (block 61). In one embodiment, the predefined entities can include different types, such as location, person name, dictionary words, and date and time. A list of names is generated for each entity type (block 62) and compiled for inclusion in the entity lists. The names can represent specific entities under an entity type and can be obtained from existing databases or entered manually. The existing databases for a location entity can include GeoNames or DBpedia, while the U.S. Census database can be used for person name entities, and the British National Corpus can be used for English dictionary words. Other existing databases are possible.

Existing databases often include extremely large amounts of data. Prior to obtaining information for inclusion in the entity lists, the data can be filtered. FIG. 5 is a block diagram showing, by way of example, a table 60 of data for generating entity lists. Columns of the table include headings for entity type 61, resource 62 from which the lists of names for the entity lists are generated, and details 63 regarding how the names are selected. For a location type entity 64, the GeoNames database includes around 8 million geographical location names. The names for a location entity can be filtered based on a population threshold of the associated location. For instance, if the population threshold is set to 5,000 people, there are 234,000 international cities; 3,000 U.S. counties; 3,000 states; and 241 countries listed in the GeoNames database that have a population over 5,000. Meanwhile, a further database can also be used to generate a list of names for the location entity. The DBpedia database includes 30,000 U.S. cities having a population over 5,000. All location names that satisfy the population threshold are added to the entity lists for a location type entity. Other thresholds are possible.

For an individual name type entity 65, popular contemporary names can be selected based on a popularity threshold. For instance, the popularity threshold can be set to 1,000 names and the 1,000 most popular names, for females, males, and last name can be selected for inclusion in the entity lists. Other thresholds are possible. Values for name popularity can be obtained from the existing databases and the more popular a name, the more likely the matching name entity represents an individual's name, as compared to a location or dictionary word.

For dictionary word type entities 66, common dictionary words can be determined and selected for inclusion in the entity lists based on a commonality threshold. The threshold can include an absolute number of the most common dictionary words, a common value threshold, which selects those dictionary words with a commonality value above the threshold, or a combination of the absolute number and common value threshold. Other methods for selecting dictionary words for inclusion in the entity lists are possible. For instance, the commonality of a dictionary word can also be determined by conducting a Web-based search.

For date and time type entities 67, periods of time can be selected for inclusion in the entity lists, such as years, months, days, time, holidays, and named time periods, such as the 21$^{st}$ Century. Other periods of time are possible. Subsequently, the name lists for the location, person name, dictionary word, and date entities are compiled to form the entity lists.

Once generated, the entity lists can be used to identify and label entities in a document. Returning to the above discussion with respect to FIG. 3, a Finite State Transducer can be used to identify and label the entities using the entity lists. The Finite State Transducer separately runs each list of entity type names over one or more documents (bock 52) to identify a term or phrase in a document that matches at least one of the entity names for that list. Each matching term is selected as an entity (block 53) and a label is assigned (block 54) to the entity based on the list and the matching name. For instance, the list for person name type entity is run over a document. The list includes the name Paris for a girl. A match for Paris is identified in the document and the term "Paris" is listed as an entity and assigned a label for person name. Subsequently, the list for location type entity, which includes the location name "Paris" is run over the same document. The term Paris in the document matches the location name Paris and is listed as an entity, as well as assigned a label for location. No matches for the term Paris are located in the dictionary word type entity list or the date and time type entity list.

Once determined, the entities identified within a document can be provided in a list. FIG. 6 is block diagram 70 showing, by way of example, a text segment 71 from a document and entity results 72. The text segment can include a sentence, paragraph, page, or whole document, as well as other segments of text. For example, the text segment 71, "Henry Ford was one of eight children of William and Mary Ford. He was born on the family farm near Dearborn, Mich., then a town eight miles west of Detroit, on Jul. 30, 1863," includes two sentences. The entity lists are applied to the text segment to identify the entities 72 "Henry," "Ford," "Mary," "Dearborn, Mich.," "Detroit," "Henry Ford," "William," "Mary Ford," and "Jul. 30, 1863." Specifically, a textual pattern based on the name list, and typical character content and ordering for each different entity type is separately run over the text segment to identify words or phrases in the text segment as an entity. For instance, the character content and ordering can include common orderings of words for person names, which can be identified by a last name followed by a comma and then a given name or a given name followed by a last name, as well as other orderings of words that commonly represent a person's name. Further, each identified entity is labeled with an entity type based on the entity type list with the matching name. The results for each list are then compiled and provided for review. Each of the identified entities can be listed with a location occurrence 73 of that entity within the document and an entity type label 74.

Figure 7:
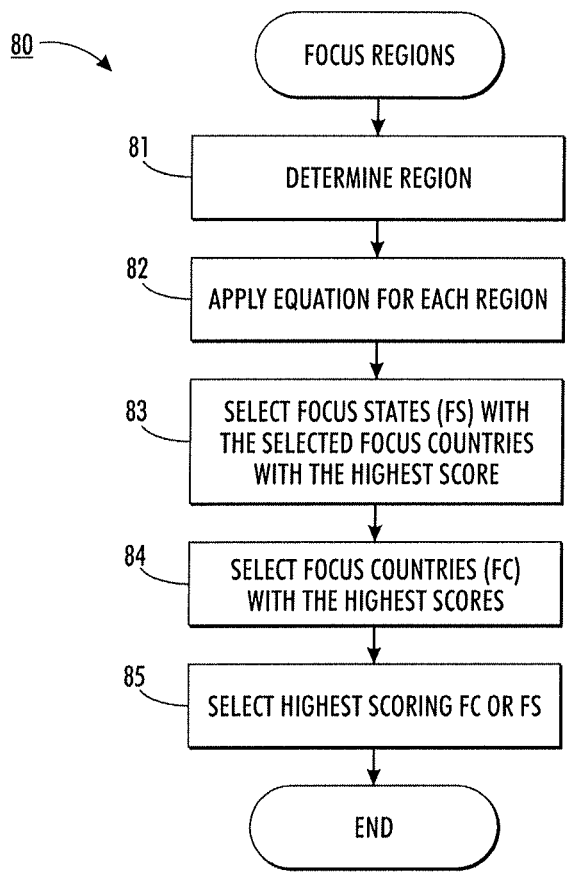
FIG. 7 is a flow diagram showing, by way of example, a process for determining focus regions for use in the method of FIG. 2.

Once the entities are identified in the document, candidate locations are determined for each location entity and initially scored. The initial scores can then be used to define possible focus regions for the document in which the location entities are located. FIG. 7 is a flow diagram showing, by way of example, a process for determining focus regions for use in the method of FIG. 2. Determining focus regions for a document can provide clues about geographical regions that are discussed in the text, which in turn can be used to resolve ambiguity between candidate locations. The focus regions can include focus countries and focus states, as well as other focus regions, which can be used to increase interpretation of other locations in the document.

If an entity represents a unique location, for which no other locations with the same name exist, metadata regarding the location entity is used to set the focus country and state. However, for entities that represent more than one location, focus regions can be determined by assigning a score to each region identified in a document, according to the equation below:

$$S(R_i) = \sum_{e \in E} \left\{ \sum_{\substack{l \in R_i \cap L(e) \\ l = SmallCity}} tf(l) * g(l) * w \right\} \quad (1)$$

where tf(l) is the term frequency for each candidate location entity within a document; g(l) is the initial score assigned to each candidate location and other locations within the particular region and mentioned within the document; and w is an ambiguity weight assigned to each candidate location. Meanwhile, $R_i \cap L(e)$ represents a set of matched locations in the particular region to which the equation is being applied.

A particular region is selected (block 81) based on the candidate locations. For instance, the candidate locations can include Paris, France and Paris, Tex. The selected regions can include France and Texas. The equation is applied for each selected region (block 82). A number of term occurrences for an entity within a region are multiplied by an initial score for one or more of the candidate locations for that entity within the same region and by an ambiguity weight for the entity to result in a score for the region. The ambiguity weight assigns higher weights to unambiguous entities. In one embodiment, if the entity is ambiguous, the ambiguity weight is zero. In a further embodiment, only candidate locations that represent small ambiguously named cities are associated with an ambiguity weight of zero.

When applied to the region, Texas, the equation considers all locations in the document that are located in Texas as candidates. For instance, the document includes the entity Paris, as well as San Antonio and Victoria, which are each cities in Texas. The term occurrence for each city is determined and multiplied by the initial score and ambiguity weight for that city. Subsequently, the scores for each candidate are added to result in the score for the region, Texas. Additionally, since San Antonio is also a city in Florida, the equation is applied to determine a score for the state, Florida. Thus, the document is analyzed to identify whether any other cities located in Florida are included in the document. If so, the score is based on a sum of all the Florida cities mentioned in the document. Otherwise, the score is based on the occurrences of San Antonio in the document and the associated ambiguity weight and initial score.

Next, the focus country can be determined by applying the equation to all the states identified as being possibly represented in the document. For the U.S.A, the equation is applied to the states Texas and Florida, while for the country France, the equation is applied to the city Paris since no states exist in France. The U.S.A should have a higher score since the document includes more occurrences of states and cities in the U.S.A than in France.

Once the scores are determined for each region, those regions with the highest scores are selected. Specifically, the states or equivalent geographical areas with the highest scores are selected as focus states (block 83) and the country associated with the focus state and that has the highest score is selected as the focus country (block 84). The focus countries and states with the highest scores can be selected based on a predetermined threshold, a predetermined number of focus regions, or a combination of a predetermined threshold and number of focus regions. Thus, the equation is applied to the regions France and Texas and whichever region has the highest score is selected. If Texas is selected as the focus state, then the U.S.A is selected as the focus country. Conversely, France can be selected as the focus country, but no focus state is determined since France does not include states.

In a further embodiment, focus regions can be determined for segments of a document, instead of a whole document. The segments can include sentences, paragraphs, or pages. Thus, focus countries and state can be determined for each sentence, paragraph, or page, which can result in more than one focus country and focus state per document.

Figure 8:
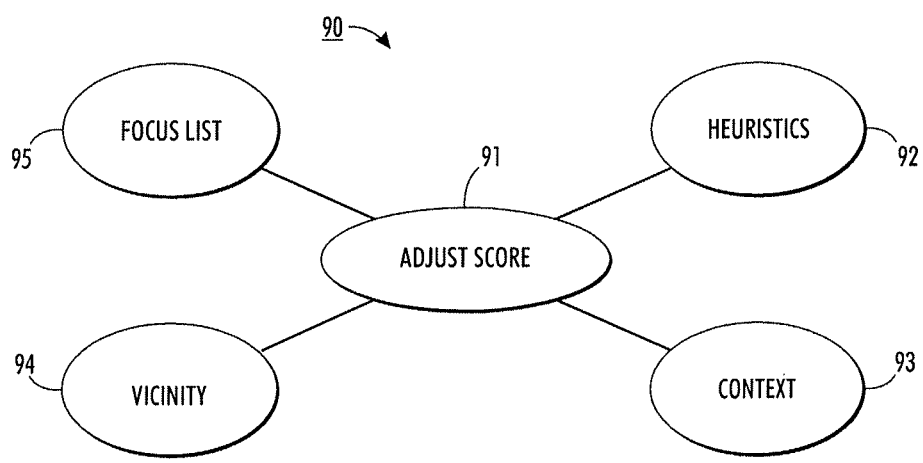
FIG. 8 is a flow diagram showing, by way of example, a process for adjusting scores for use in the method of FIG. 2.

Once determined, the focus regions can be used with other subroutines to adjust the scores of the entities and candidate locations. FIG. 8 is a flow diagram 90 showing, by way of example, a process for adjusting scores 91 for use in the method of FIG. 2. Initial scores assigned to each candidate location for an entity can be adjusted based on subroutines, including heuristics 92, context 93, vicinity 94, and focus information 95 subroutines. During the heuristics subroutine, one or more heuristic rules are applied to the text of a document to identify place names or other entity types. FIG. 9 is a block diagram 100 showing, by way of example, heuristic rules 102 for applying to a document to identify types of entities. A description 103 of the rule and an example 104 is associated with each heuristic rule 102. A formatted group heuristic rule 105 recognizes text as a location when a comma follows the first word, which is then separated by a space and a second word follows. In one embodiment, the second word is indicative of a location, such as a two letter abbreviation for a state or country. For instance, the text, "Oakland, Calif." will be recognized as a location since the text follows the formatted group heuristic rule.

The hint word 106 heuristic rule identifies words as locations when one or more words located prior to or subsequent to the location are a reliable indication, such as "the city of" Oakland, which identifies Oakland as a city. Other words or phrases that reliably indicate a location include "state, country, region, location, and destination." However, other words or phrases are possible. The uniform meaning 107 heuristic rule identifies locations that share the same name with a previously identified location. For instance, the text of a document reads " . . . in Oakland, Calif.," which is identified as a location using the formatted group heuristic rule. Subsequently, in a later paragraph, the text reads ". . . in Oakland." The location, Oakland, is determined to be Oakland, Calif. based on the previous occurrence of "Oakland, Calif." under the formatted group heuristic rule, rather than Oakland, Ind. The name variation 108 heuristic rule determines that a particular word is not a location when the word is part of a previously identified person's name, is a variation of a previously identified person's name, or a holiday. For instance, the text of a document reads "Henry Ford is one of eight children. Henry was born in Dearborn, Mich." The second occurrence of Henry is identified as a person using the name variation heuristic rule, rather than as the city of Henry, Ill. A further heuristic rule is the exclusion rule 109, which excludes those entities that are named after places that are not a city, county, state, country, or other geographical region, such as continent. For instance, the term Washington, which occurs in the phrase "University of Washington" is excluded as a location since the phrase refers to a place, a college in Washington State. Other heuristic rules are possible.

Figure 10:
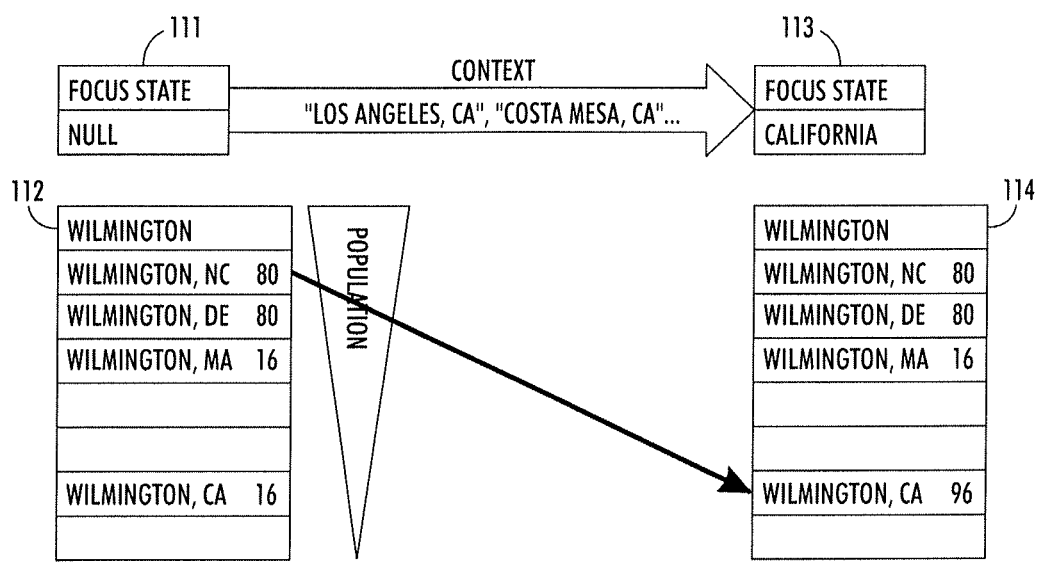
FIG. 10 is a block diagram showing, by way of example, a list of candidate cities and scores.

During the context subroutine, contextual clues are considered, including whether the text mentions affiliated focus regions and natural language clues. FIG. 10 is a block diagram showing, by way of example, a list of candidate cities 112, 114 and scores. For example, considering cities named "Wilmington" without additional context, "Wilmington, N.C." is assigned a higher score than "Wilmington, Calif." due to a larger population. However, when the context of the text document is considered, occurrences of the phrases "Los Angeles, Calif." and "Costa Mesa, Calif." in the document result in the location "Wilmington, Calif." being assigned a higher score than "Wilmington, N.C." Thus, the focus state 111, 113 can be determined based on the city with the highest score.

Further, natural language clues in the document can also be analyzed to adjust the initial scores of the entities. The natural language clues can include words or phrases, such as at, in to, in front of, or at a mentioned place. Other natural language clues are possible. Based on each natural language clue identified in the document with respect to an entity, the initial score of that entity can be lowered, stay the same, or be raised.

Figure 11:
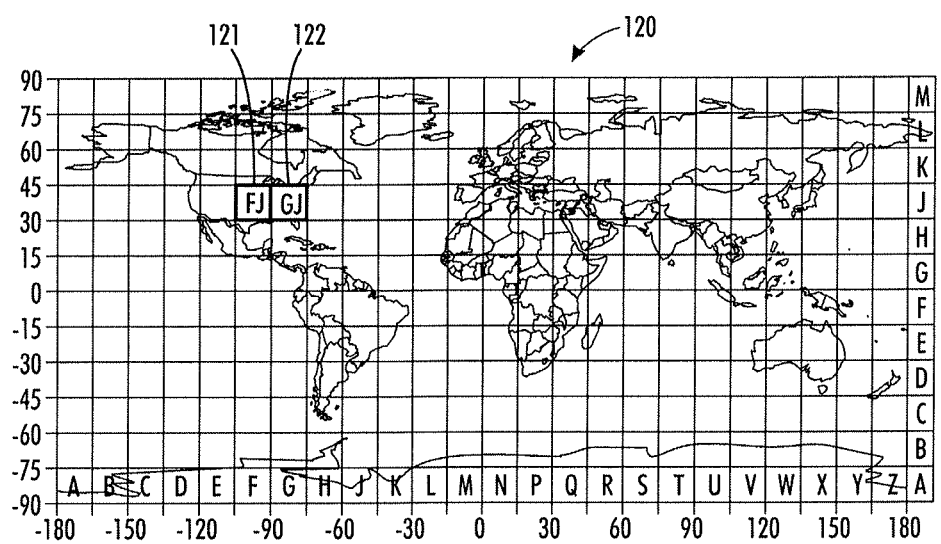
FIG. 11 is a block diagram showing, by way of example, a map of the earth to determine proximity of two or more locations.

The vicinity subroutine uses the proximity of one or more candidate locations to assign a score, which can be used to adjust the initial scores of those candidate locations. FIG. 11 is a block diagram showing, by way of example, a map 120 of the earth to determine proximity of two or more locations. First, a map of the world is divided into fixed size cells 121, 122, which are each labeled with latitude and longitude coordinates. The candidate locations are then mapped into one of the cells and scores are assigned to the cells based on a number of candidate locations that are included in each cell according to the following formula:

$$S(C_i) = \sum_{e \in E} \left\{ \sum_{l \in C_i \cap L(e)} tf(l) * \max(g(l)) \right\}$$

where tf(l) is the term frequency for each entity within one or more documents and the max g(l) is the initial score assigned to each candidate location. To resolve an ambiguity between two or more candidate locations, those candidate locations that are closest to high density grid cells are assigned a higher score. To perform a lookup of the candidate locations in the grid, a hash table is built with grid coordinates as the keys and the contents of the grid cells as values. A hash key is computed based on a combination of the latitude and longitude coordinates of one of the points in the cell, such as the upper left hand corner or center. Any area can then be assigned to a hash table cell or a set of cells by computing the hash for every cell. A hash table allows this to be done quickly. Nearby geographical objects than then be found by computing the hashes of the neighboring cells and retrieving the contents of those cells. For example, the density for cell (F,J) 121 is higher than cell (G,J) 122 since cell (F,J) 121 includes Kansas City, Kans. and St. Louis, Mo., while cell (G,J) 122 only includes Detroit, Mich. Ambiguity between candidate locations Columbia, Mo. and Columbia, S.C. can be resolved using the two cells. Since cell (F,J) 121 has a higher density, a higher score is assigned to Columbia, Mo. in cell (F,J) 121 instead of Columbia, S.C.

in cell (G,J) 122. Cities in larger regions can be found by combining the contents of neighboring cells. For example, the nine cells centered on FJ (EH, FH, GH, EJ, FJ, GJ, EK, FK, GK) may be combined to find cities that are within a few hundred miles of Kansas City, Kans.

The focus information subroutine utilizes the lists of focus countries and focus states, and the relative scores of the countries and state to resolve ambiguous names of cities and counties. Specifically, each candidate location for a location entity is compared with the selected focus regions. If the candidate location is included within one or more of the selected focus regions, the score for the candidate location is increased by a predetermined amount.

Once the location of an entity is determined, that location can be geocoded by determining the coordinates for that location. The geocoded locations in a document can be used to help users enhance document interaction and understanding by viewing the entities, reading relevant text snippets, mapping places in the world, searching nearby documents, and merging the results into a database. Differentiating between entities based on a display can assist a user in distinguishing ambiguous terms in the document. Once ambiguities between the entities are distinguished and an identification is assigned to the entity, occurrences of the entities can be marked based on the assigned identification. The markings can include font size, font type, and color coding, as well as other types of markings. The markings can be assigned based on the identifications assigned to the entities. For example, Paris, Tex. may have a different font size, color, or font type than Paris, France, which occurs in the same document.

Figure 12:
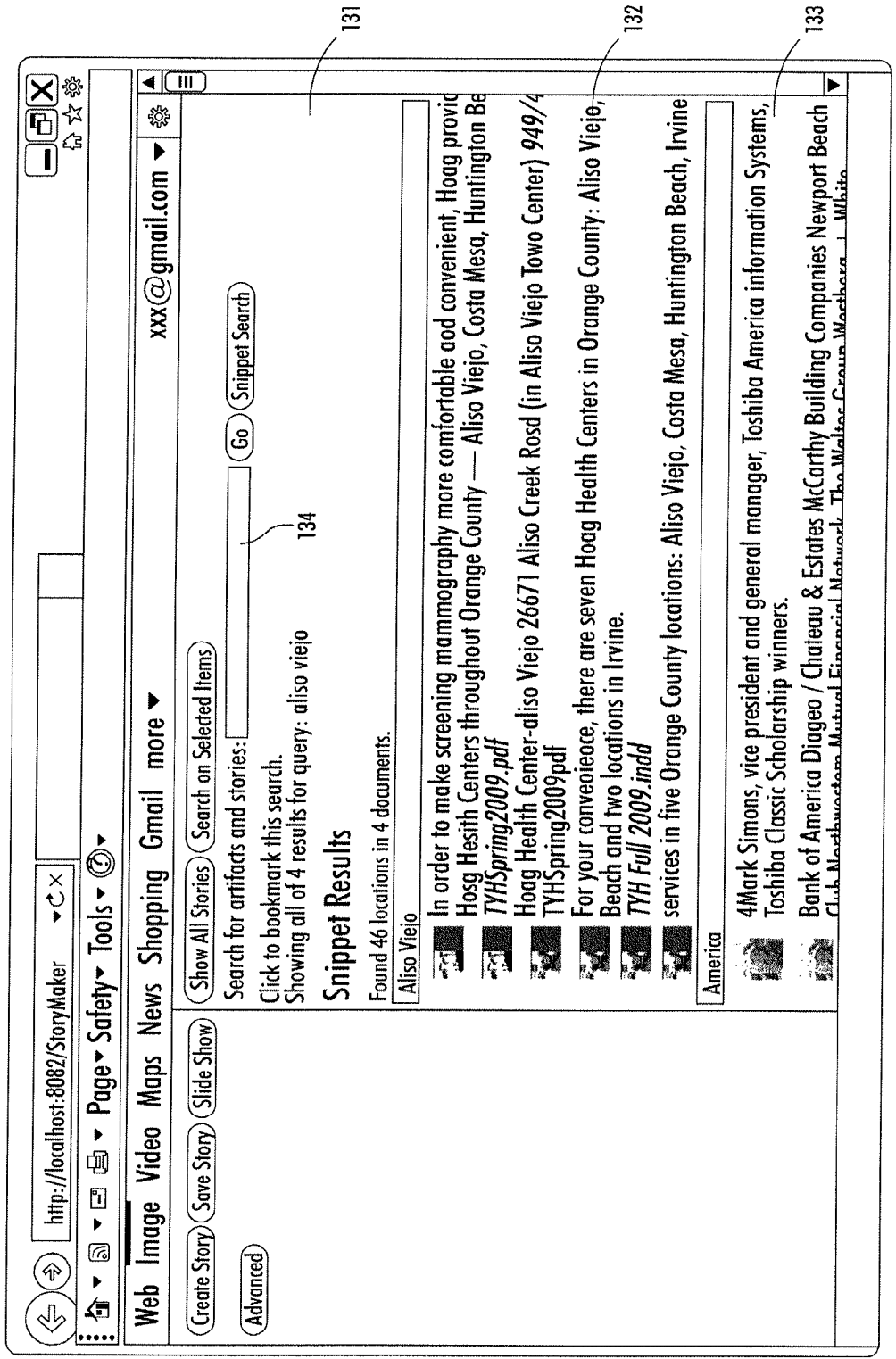
FIG. 12 is a screenshot of a Web page showing, by way of example, results for a location search query.

Further, the identified entities and geocoded locations can be used to search for text segments that mention location with other search terms. FIG. 12 is a screenshot of a Webpage 130 showing, by way of example, results 132 for a location search query 134. A search query, including at least one location and other search terms, can be entered by a user into a search field 134 in a search box 131. The search box 131 can include a number of results identified, as well as the search field. A search can be conducted to identify text segments that include the location and other search terms as results. The results can be sorted by location within a result box 132 and each text segment result can be displayed with a thumbnail of the whole document, which can be accessed by the user. The text segment results can be from the same or different documents. A further result box 133 can include text segments from documents that include locations related to the locations in the search query. The Webpage 130 can be used to identify those documents that mention a particular location, as well as to identify other locations within the document results, which may be relevant to the search query location.

Figure 13:
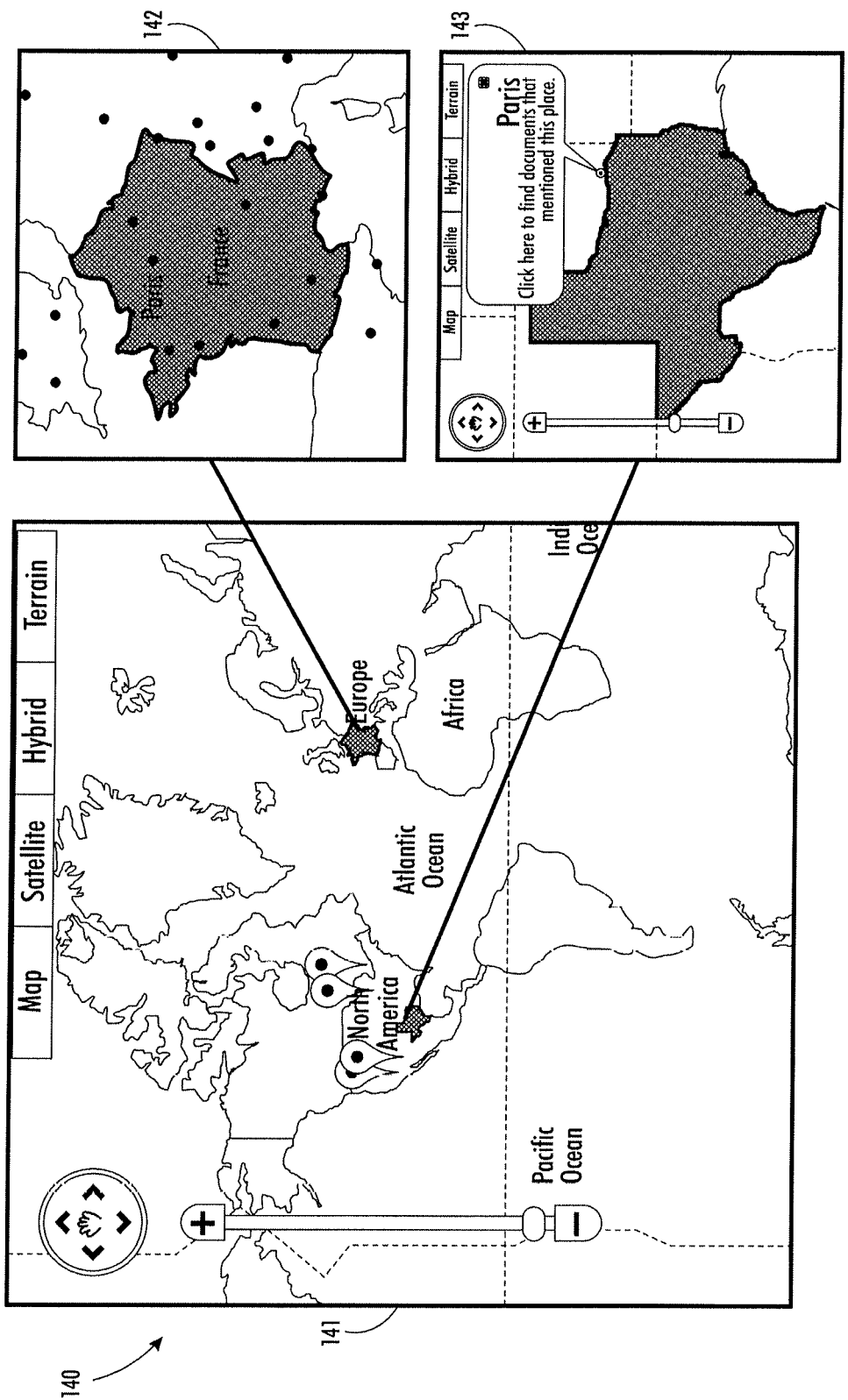
FIG. 13 is a block diagram showing, by way of example, a map with specific locations.

The geocoded locations can also be used to identify locations on a map and conduct a search for documents that include the identified location. FIG. 13 is a block diagram showing, by way of example, a map 140 with specific city and state locations. Specific locations on a map can be identified, such as a city, state, or country, as well as other locations. Each specified location can be identified by location type using display tools, such as color coding, outlining, highlighting, or shading, or using a combination of the display tools. For example, cities can be identified by a "bubble" marker and states can be outlined in red, while countries can be shaded in blue. The location Paris, France can be identified on the map as a green dot within the blue shaded country of France. In contrast, Paris, Tex. can be identified as a green dot within the red outlined state of Texas. The specific locations can pop up as a separate window 142, 143 for further analysis. Additionally, users can explore further information based on geographical attributes of the location by clicking a marker on the map, for example, which triggers an information box to appear that shows the name of the selected location and allows the user to find other documents that mention the location.

Figure 14:
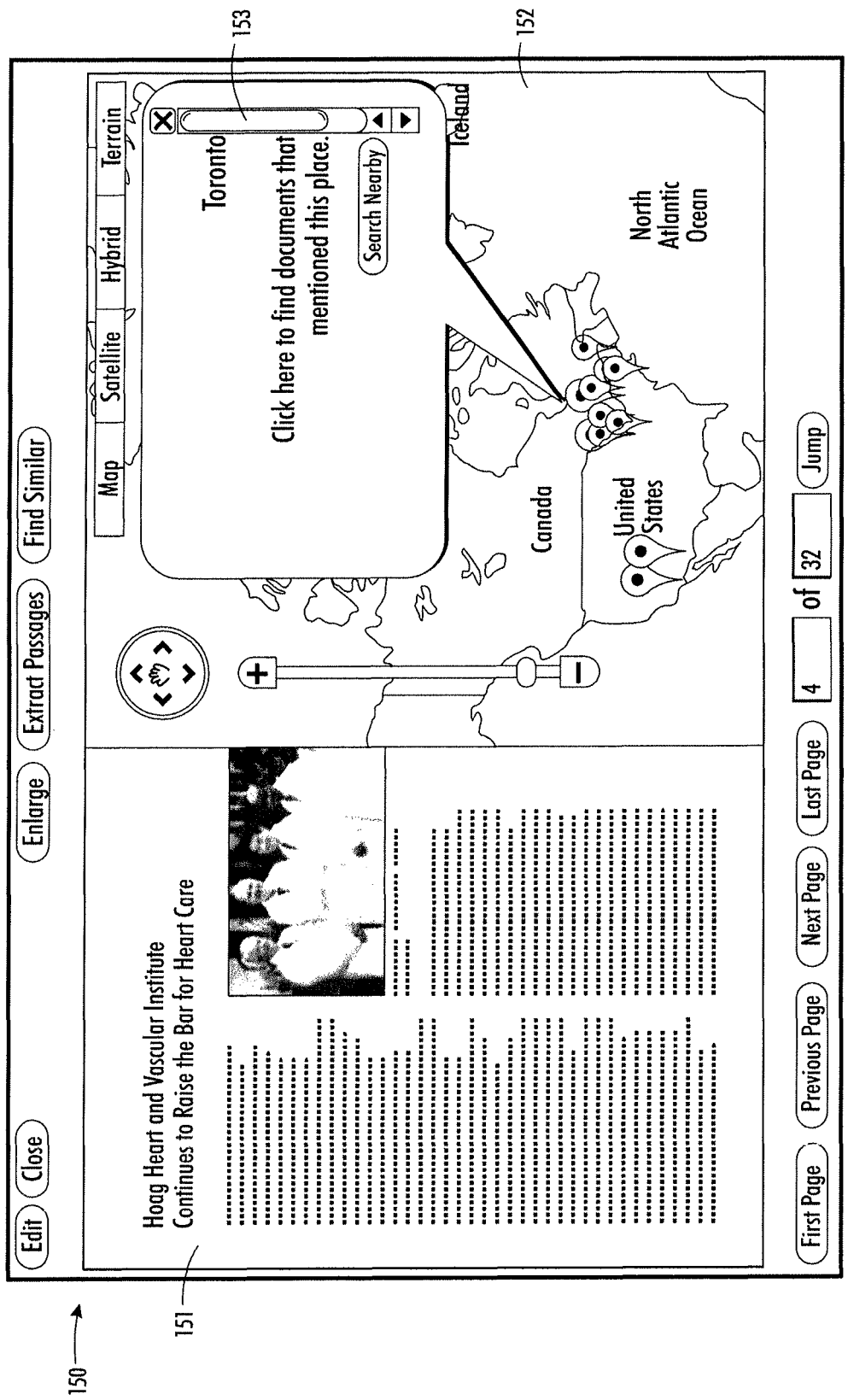
FIG. 14 is a screenshot of a Web page showing, by way of example text documents positioned on a map by location.

In addition to identifying documents that include a selected location, further documents that include nearby locations can also be identified. FIG. 14 is a screenshot of a Webpage 150 showing, by way of example text documents positioned on a map by location. The left side of the Web page 150 can display a document 151 related to one or more select locations. The right side of the Web page 150 can include an adjustable map 152 to display cities, counties, states, countries, and continents. Markers can be used to identify select cities, while other display tools can be used to identify counties, states, countries, and continents, as described above with reference to FIG. 13. A user can select one of the markers to identify documents that mention locations nearby the location represented by the marker. Nearness can be determined by the user via a search box that is positioned over the marker and which spans a particular area of interest around the marker. The identified nearby locations can be displayed by a different colored marker. However, other displays are possible.

In a further embodiment, a single entity in a document may used to refer to two or more candidate locations. In this case, ordering of the entity occurrence can be considered. For example, a first paragraph refers to Paris, Tex. with subsequent references to Paris. When considering ordering, all the subsequent references to Paris can be labeled as Paris, Tex. Additionally, in a second paragraph, Paris, France is provided with subsequent references to Paris. This time, the subsequent references to Paris will be labeled as Paris, France until Paris, Tex. occurs again in the text.

While the invention has been particularly shown and described as referenced to the embodiments thereof, those skilled in the art will understand that the foregoing and other changes in form and detail may be made therein without departing from the spirit and scope of the invention.

What is claimed is:

1. A method for mapping text phrases to geographical locations, comprising:
   identifying in a document, an ambiguous entity that represents two or more representative entity types, wherein a first of the entity types further represents two or more candidate locations;
   assigning an initial score to a second of the entity types and to each of the candidate locations;
   determining the initial scores for the candidate locations, comprising:
     determining for each candidate location an administrative level comprising one of a region, country, state, county, and city to which that candidate location belongs, wherein each administrative level is associated with a predetermined score;
     assigning to the each of the candidate locations, the predetermined value associated with the determined administrative level for that candidate location;
     when at least one of the candidate locations comprises a city, determining a value for that candidate location based on a comparative size of the candidate location by identifying an average size city in a same country as that candidate location and comparing a size of that candidate location to the average size city in the same country; and combining the values for the administrative level and the comparative size as the initial score for each of the candidate locations comprising a city and designating the predetermined value associated with the determined administrative level for the candidate locations other than a city;

adjusting the initial scores based on one or more subroutines;

selecting one of the second representative entity type, a first of the candidate locations, and a second of the candidate locations with the highest adjusted initial score as an identified label for the ambiguous entity; and applying the identified label to all occurrences of the ambiguous entity in the document.

2. A method according to claim 1, further comprising:
determining the initial score for the second entity type that comprises a person representative entity type, comprising:
identifying a popularity of a name for the person representative entity type; and
assigning a predetermined score to the person representative entity type based on the identified popularity.

3. A method according to claim 1, further comprising:
determining the adjusted scores based on at least one of heuristics, context, vicinity, and focus regions.

4. A method according to claim 1, further comprising:
generating an index, comprising:
identifying occurrences of the entity in the documents; and
compiling a list of the entity occurrences;
utilizing the index to apply the selected location to all occurrences of the entity in the documents.

5. A method according to claim 1, wherein the representative entity types for the ambiguous entity comprise at least one of a location, person name, and time.

6. A method for mapping text phrases to geographical locations, comprising:
identifying in a document, an ambiguous entity that represents two or more representative entity types comprising a location, person, or time;
assigning an initial score to each representative entity type and adjusting the initial score based on one or more subroutines;
determining the initial score for the location, comprising:
determining an administrative level comprising one of a region, country, state, county, and city to which the location belongs, wherein each administrative level is associated with a predetermined value and assigning the predetermined value based on the determined administrative level for that location;
when the location comprises a city, determining a value based on a comparative size of that location by identifying an average size city in a same country as the location and comparing a size of the location to the average size city in the same country; and
combining the values for the administrative level and the comparative size as the initial score for the location;
selecting the representative entity type with the highest score for the entity; and
applying the representative entity type to all occurrences of the entity in the document.

7. A method according to claim 6, further comprising:
generating entity lists, comprising:
predefining entities comprising at least one of identifying predefined words and determining regular expression patterns; and
generating a list of names for each entity; and
matching the ambiguous entity to a name in at least two of the entity lists to identify the representative entity types.

8. A method according to claim 6, further comprising:
determining the initial score for the person representative entity type, comprising:
identifying a popularity of the person representative entity type; and
assigning a predetermined score to the person representative entity type based on the identified popularity.

9. A method according to claim 6, further comprising:
determining the adjusted scores based on at least one of heuristics, context, vicinity, and focus regions.

10. A method according to claim 6, further comprising:
generating an index, comprising:
identifying occurrences of the entity in the documents; and
compiling a list of the entity occurrences;
utilizing the index to apply the selected location to all occurrences of the entity in the documents.

11. A method for mapping text phrases to geographical locations, comprising:
identifying in a document, an ambiguous entity that represents two or more locations as candidate locations;
determining an initial score for the locations associated with the candidate locations, comprising:
determining for each location an administrative level comprising one of a region, country, state, county, and city to which that location belongs, wherein each administrative level is associated with a predetermined score;
assigning to each of the locations, the predetermined value associated with the determined administrative level for that location;
when at least one of the locations comprises a city, determining a value for that location based on a comparative size of the location by identifying an average size city in a same country as that location and comparing a size of that location to the average size city in the same country; and
combining the values for the administrative level and the comparative size as the initial score for each of the locations comprising a city and designating the predetermined value associated with the determined administrative level for the locations other than a city;
adjusting the initial scores based on one or more subroutines;
selecting the location of the candidate with the highest adjusted score for the ambiguous entity; and
applying the selected location to all occurrences of the entity in the document.

12. A method according to claim 11, wherein the representative entity types for the ambiguous entity comprise at least one of a location, person name, and time.

13. A method according to claim 11, further comprising:
generating entity lists, comprising:
predefining entities; and
generating a list of names for each entity; and
matching the ambiguous entity to a name in at least two of the entity lists to identify the representative entity types.

14. A method according to claim 11, further comprising:
determining at least one focus region for one such document comprising:
- determining a frequency of occurrence of each candidate location belonging to a particular region;
- assigning a score to each region based on the frequencies of occurrence and weight for the location candidates; and
- selecting the region with the highest score as the focus region.

15. A method according to claim 11, further comprising: increasing the score of the locations that belong to the focus region.

16. A method according to claim 15, wherein the focus region is determined in accordance with the following equation:

$$S(R_i) = \sum_{e \in E} \left\{ \sum_{\substack{l \in R_i \cap L(e) \\ l = SmallCity}} tf(l) * g(l) * w \right\}$$

where $R_i$ is the focus region, tf(l) is the term frequency for each candidate location entity within a document; g(l) is the initial score assigned to each candidate location and other locations within the particular region and mentioned within the document; and w is an ambiguity weight assigned to each candidate location.

17. A method according to claim 11, further comprising: determining the adjusted scores based on at least one of heuristics, context, vicinity, and focus regions.

18. A method according to claim 11, further comprising:
- dividing a map of the earth into cells each associated with latitude and longitude coordinates;
- mapping one of the locations into the cells of the map;
- assigning scores to the cells based on a number of other locations that are located in that cell; and
- assigning the location to the cell with the highest score.

19. A method according to claim 11, wherein the location is mapped into the cells via a hash function in which a key is based on a range of latitudes and longitudes within at least one of the cells.

20. A method according to claim 11, further comprising:
generating an index, comprising:
- identifying occurrences of the entity in the documents; and
- compiling a list of the entity occurrences;
utilizing the index to apply the selected location to all occurrences of the entity in the documents.

* * * * *